US007269272B2

(12) United States Patent
Murakami

(10) Patent No.: US 7,269,272 B2
(45) Date of Patent: Sep. 11, 2007

(54) IMAGE PROCESSING APPARATUS FOR EMBEDDING INFORMATION WITH A NOISE-MULTIPLEXED DISTRIBUTION, AND METHOD, COMPUTER PROGRAM, AND COMPUTER-READABLE STORAGE MEDIUM THEREFOR

(75) Inventor: Tomochika Murakami, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 939 days.

(21) Appl. No.: 10/600,532

(22) Filed: Jun. 23, 2003

(65) Prior Publication Data

US 2004/0001609 A1 Jan. 1, 2004

(30) Foreign Application Priority Data

Jun. 28, 2002 (JP) ............................. 2002-191132

(51) Int. Cl.
G06K 9/00 (2006.01)
G06K 15/00 (2006.01)
(52) U.S. Cl. ..................................... 382/100; 358/3.28
(58) Field of Classification Search ................ 382/100; 358/3.28; 713/176
See application file for complete search history.

(56) References Cited

U.S. PATENT DOCUMENTS

| 5,530,759 | A | * | 6/1996 | Braudaway et al. ........ 713/176 |
| 6,137,892 | A | * | 10/2000 | Powell et al. ................ 382/100 |
| 6,233,347 | B1 | | 5/2001 | Chen et al. |
| 6,738,493 | B1 | | 5/2004 | Cox et al. |
| 6,975,746 | B2 | | 12/2005 | Davis et al. |
| 6,996,248 | B2 | | 2/2006 | Fudge et al. |
| 7,174,030 | B2 | * | 2/2007 | Sugahara et al. ........... 382/100 |

(Continued)

FOREIGN PATENT DOCUMENTS

EP 0 725 529 A2 6/1996

(Continued)

OTHER PUBLICATIONS

Y. K. Lee and L. H. Chen, "High capacity image steganographic model," Proc: Inst. Elect. Eng., Vis. Image Signal Processing, vol. 147, No. 3, pp. 288-294, 2000.*

(Continued)

Primary Examiner—Colin LaRose
(74) Attorney, Agent, or Firm—Fitzpatrick, Cella, Harper & Scinto

(57) ABSTRACT

This invention can multiplex noise in multilevel image data to reversibly embed visible additional information with a noise-multiplexed distribution while maintaining the atmosphere of the multilevel image data subjected to embedding. For this purpose, when noise is multiplexed on multilevel image data to embed visible additional information with a noise-multiplexed distribution, information representing whether or not to multiplex noise for each pixel is input as the additional information. Whether a pixel of interest in the multilevel image data is located at a position where noise is to be multiplexed is determined on the basis of the additional information (S106). When the pixel of interest is determined to be located at the position where noise is to be multiplexed, a bit region where noise is to be multiplexed in the pixel of interest is specified on the basis of data in a region near the pixel of interest (S110). Bit information is reversibly changed in the specified bit region of the pixel of interest (S112, S114).

19 Claims, 11 Drawing Sheets

U.S. PATENT DOCUMENTS

| | | | |
|---|---|---|---|
| 2001/0017709 A1 | 8/2001 | Murakami et al. | |
| 2002/0002679 A1 | 1/2002 | Murakami et al. | |
| 2003/0099373 A1* | 5/2003 | Joo et al. | 382/100 |
| 2006/0115112 A1* | 6/2006 | Yeung et al. | 382/100 |

FOREIGN PATENT DOCUMENTS

| | | |
|---|---|---|
| JP | 05-110971 | 4/1993 |
| JP | 8-241403 | 9/1996 |
| JP | 8-256321 | 10/1996 |
| JP | 2000-184173 | 6/2000 |

OTHER PUBLICATIONS

Y. Hu and S. Kwong, "Wavelet domain adaptive visible watermarking," Electron. Lett., vol. 37, Sep. 2001.*

S. P. Mohanty, K. R. Ramakrishnan, and M. S. Kankanhalli, "A DCT domain watermarking technique for images," in Proc. IEEE Int. Conf. Multimedia Expo, 2000, pp. 1029-1032.*

H. Daren, L. Jiufen, H. Jiwu, and L. Hongmei, "A DWT-Based Image Watermarking Algorithm," Proceedings of the IEEE International Conference on Multimedia and Expo, pp. 429-432, 2001.*

S. D. Lin and C.-F. Chen, "A Robust DCT-Based Watermarking for Copyright Protection," IEEE Transactions on Consumer Electronics, 46(3), Aug. 2000, pp. 415-421.*

J. Huang, Y. Q. Shi, and Y. Shi, "Embedding image watermarks in DC components," IEEE Trans. Circuits Syst. Video Technol., vol. 10, pp. 974-979, Sep. 2000.*

* cited by examiner

FIG. 4A

| PIXEL VALUE | B7 | B6 | B5 | B4 | B3 | B2 | B1 | B0 | Δmax |
|---|---|---|---|---|---|---|---|---|---|
| 255 | | | Y | Y | | | Y | | 50 |
| 254 | | | Y | Y | | | Y | | 50 |
| ⋮ | | | | | | | | | ⋮ |
| 112 | | | | | Y | Y | Y | | 26 |
| ⋮ | | | | | | | | | ⋮ |
| 1 | | | | | | | Y | | 2 |
| 0 | | | | | | | Y | | 2 |

401 NEIGHBORING REGION / 402 ARITHMETIC BIT REGION / 403

VISIBLE INTENSITY S = 1

FIG. 4B

| PIXEL VALUE | B7 | B6 | B5 | B4 | B3 | B2 | B1 | B0 | Δmax |
|---|---|---|---|---|---|---|---|---|---|
| 255 | | | | Y | Y | | Y | | 26 |
| 254 | | | | Y | Y | | Y | | 26 |
| ⋮ | | | | ⋮ | ⋮ | | ⋮ | | ⋮ |
| 112 | | | | | Y | Y | | | 12 |
| ⋮ | | | | | | | ⋮ | | ⋮ |
| 1 | | | | | | | Y | | 2 |
| 0 | | | | | | | Y | | 2 |

NEIGHBORING REGION / ARITHMETIC BIT REGION

VISIBLE INTENSITY S = 2

F I G. 5
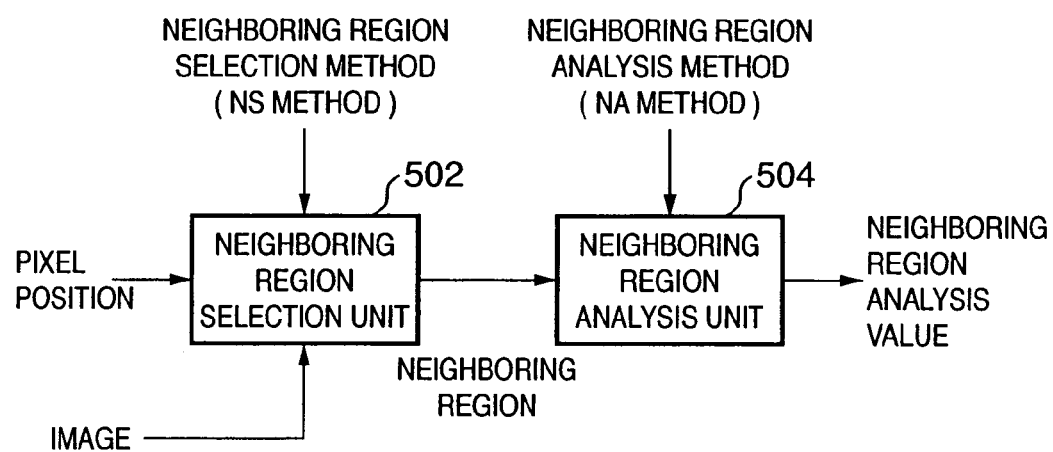

IMAGE PROCESSING APPARATUS FOR EMBEDDING INFORMATION WITH A NOISE-MULTIPLEXED DISTRIBUTION, AND METHOD, COMPUTER PROGRAM, AND COMPUTER-READABLE STORAGE MEDIUM THEREFOR

FIELD OF THE INVENTION

The present invention relates to an image processing apparatus and method which perform conversion for degrading the image quality and inversion for removing the image quality degradation for digital image data of a still or moving image in order to protect the copyright of the image, a computer program, and a computer-readable storage medium.

BACKGROUND OF THE INVENTION

A digital image used to process an image as digital data can be easily copied by a computer or the like and transmitted via a communication line without degrading the image quality, compared to a conventional analog image. This feature, however, makes it easy to illicitly copy and redistribute a digital image having a copyright or the like.

To prevent this, there is known a digital watermark method. Digital watermarks are roughly classified into an invisible digital watermark obtained by invisibly embedding watermark information such as copyright information or user information, and a visible digital watermark obtained by visibly forming in an image a watermark image such as the logotype of a company having a copyright.

As for the invisible digital watermark, embedded watermark information cannot be recognized or is hardly recognized in an embedded image at a glance. Watermark information is rarely deleted, but is illicitly copied and distributed more frequently than visible watermark information. Even if a digital image is illicitly copied or distributed, watermark information remains in the digital image. An illicit user can be specified by a user ID or the like embedded as the watermark information.

As for the visible digital watermark, watermark information is visibly written in a digital image. It is difficult to directly utilize the digital image, suppressing illicit copying and illicit distribution. As a conventional visible digital watermark embedding method, the pixel value of an image representing copyright information such as the logotype of a copyright holder is replaced with the pixel value of an original image, embedding copyright information in the original image. The drawback of this method is that the original image cannot be reconstructed without difference information because the pixel value of the original image is lost.

In online sales of a digital image via the Internet or the like, the copyright is protected by not fully disclosing digital contents before purchase. The user grasps rough contents of the image, and then purchases the image.

To achieve this purpose, a digital content distributor uses a method of disclosing or distributing a reduced image (thumbnail image) or an image prepared by intentionally degrading the image quality of all or part of an original image in order to present rough contents of the image to the customer.

One candidate of a means for degrading the image quality is a visible digital watermark containing the logotype of a copyright holder or the like. If the visible digital watermark is not reversible, the original image of a degraded-quality portion must be transmitted again. In this case, retransmission of only a key is safer than retransmission of the original image via a network in terms of the communication amount and tapping in retransmission. Online image delivery services require a method of removing image quality degradation by using a key.

One of the techniques is a semi-disclosure technique. According to the semi-disclosure technique, bit information at an arbitrary bit position is extracted in an arbitrary region of an original image, and subjected to arithmetic processing such as encryption based on a key, degrading the image quality of the original image.

In the use of the semi-disclosure technique, bit information of part of an original image is saved, and conversion processing based on a key is performed for an extracted bit string to control the image quality of an image to be disclosed. Inversion processing based on a key is done to reconstruct the original image from the quality-degraded image.

An example of the semi-disclosure technique is disclosed in Japanese Patent Laid-Open No. 8-256321. This reference proposes a method of extracting part of the bit string of an image which is compression-coded by JPEG or MPEG compression coding, directly converting the extracted bit string by an independently defined conversion method without referring to a part other than the extracted part, and decoding the image.

If the user wants to purchase the original image of a distributed image whose quality is degraded, he/she acquires a key used to convert the bit string. The user can acquire a completely reconstructed content from the partially scrambled image and the key.

This method preserves the feature of an original image, but is a kind of scramble (encryption). This method does not fully consider the image quality against noise added by conversion processing.

More specifically, the image quality degradation of an image to be converted (scrambled) is determined by only a uniformly extracted bit string set in advance regardless of the feature of the image or the like. This method does not consider the human visual characteristic which is less sensitive to a change in luminance at a high luminance value and sensitive to a change at a low luminance value. The image quality degradation is not uniform at any grayscale.

In other words, there is a demand for a method of adding proper noise which allows the image appreciator to satisfactorily confirm the outline of an image.

SUMMARY OF THE INVENTION

The present invention has been made to overcome the conventional drawbacks, and has as its object to provide an image processing apparatus and method which multiplex noise on multilevel image data to reversibly embed visible additional information with a noise-multiplexed distribution while maintaining the atmosphere of multilevel image data subjected to embedding, a computer program, and a computer-readable storage medium.

It is another object of the present invention to provide an image processing apparatus and method capable of removing additional information to reconstruct an original image or an image almost identical to the original image, a computer program, and a computer-readable storage medium.

To achieve the above objects, an image processing apparatus according to the present invention has the following arrangement.

That is, an image processing apparatus which multiplexes noise on multilevel image data to embed visible additional information with a noise-multiplexed distribution comprises input means for inputting, as the additional information, information representing whether or not to multiplex noise for each pixel, determination means for determining on the basis of the additional information whether a pixel of interest in the multilevel image data is located at a position where noise is to be multiplexed, specifying means for, when the determination means determines that the pixel of interest is located at the position where noise is to be multiplexed, specifying a bit region where noise is to be multiplexed on the basis of data of a neighboring region near the pixel of interest, and change means for reversibly changing bit information for the bit region of the pixel of interest specified by the specifying means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 4A and 4B are tables showing examples of an arithmetic bit region determination table according to the first embodiment;

FIG. 5 is a block diagram showing the internal arrangement of a neighboring region selection/analysis unit which executes neighboring region selection/analysis processing;

DETAILED DESCRIPTION OF THE PREFERRED EMBODIMENTS

Preferred embodiments of the present invention will be described below with reference to the accompanying drawings.

<Description of Premise>

In the following embodiments, a component used to embed a visible digital watermark is a luminance component which constitutes a color image. Since the color component does not change upon operating the luminance component, the brightness seems to have changed to the human eye. Hence, the luminance component is suitable for embedding a visible digital watermark.

However, a component used to embed a visible digital watermark is not limited to a luminance component. R (Red), G (Green), and B (Blue) components can also be operated with good balance such that a visible digital watermark seems preferable to the human eye while preserving the feature of the image. This also applies to other components (e.g., C (Cyan), M (Magenta), and Y (Yellow)).

For descriptive convenience, an input image is an 8-bit grayscale image. An image comprised of R (Red), G (Green), and B (Blue) color components, or an image comprised of Y (Luminance) and U and V (two color difference components) color components can also be processed by a method according to the embodiments of the present invention.

Figure 10:
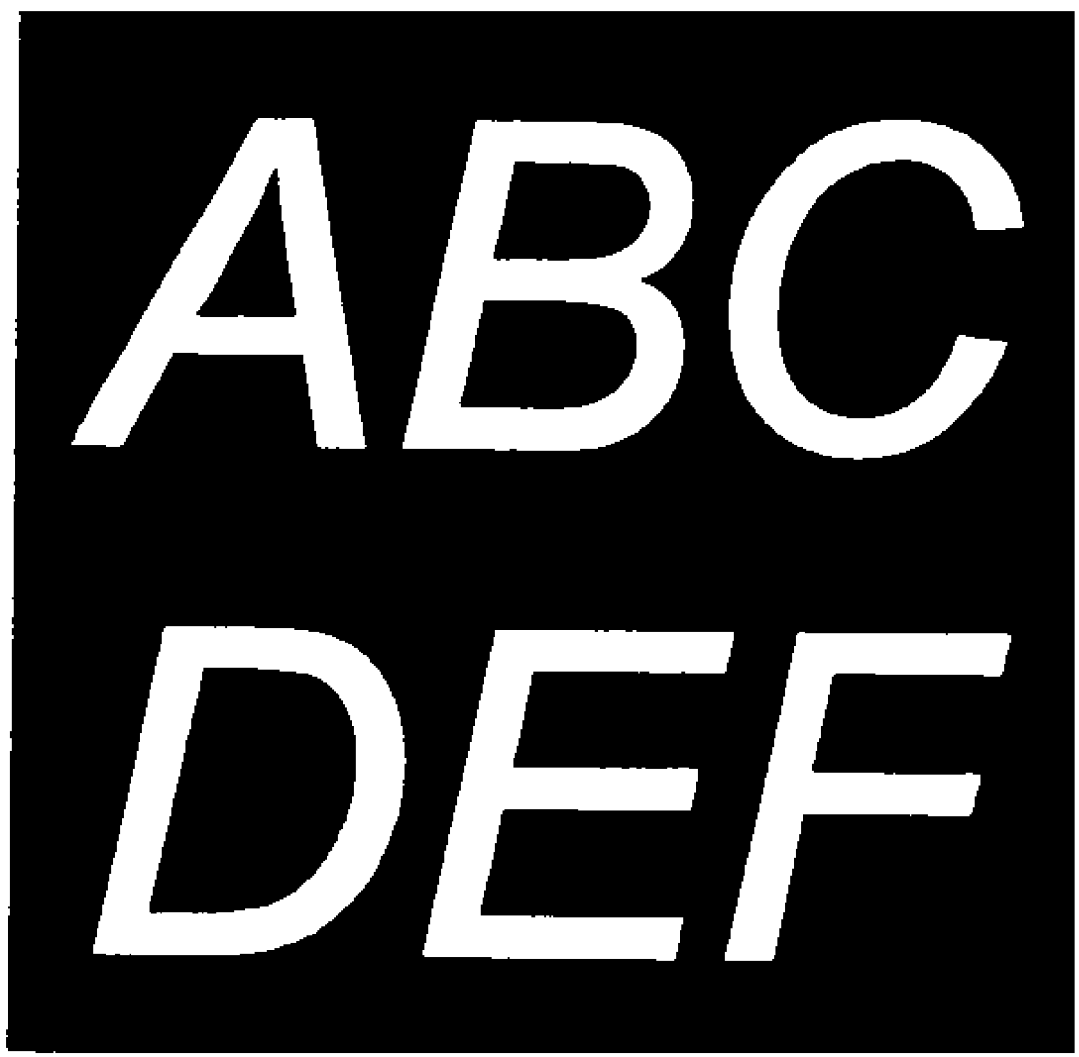
FIG. 10 is a view showing an example of watermark image shape information according to the embodiment.

FIG. 10 shows an example of watermark image shape information representing a visible digital watermark embedded in an image in the embodiments. FIG. 10 illustrates a simple character string "ABC, DEF". Watermark image shape information can be any image information such as the logotype of a copyright holder, an image photographing date and time, a personal name, a company name, a logotype, or an impressive pattern. Watermark image shape information may be a region of interest (e.g., a morbid portion of a medical image) in an image.

In the present invention, as shown in FIG. 10, watermark image shape information is a mask image having information of 1-bit pixels (binary) which defines a position where watermark processing (in the embodiments, noise is added or multiplexed) is performed (in FIG. 10, a white alphabet region represents a region where a visible digital watermark is embedded).

First Embodiment

The first embodiment of the present invention will be described below with reference to the accompanying drawings.

Figure 11:
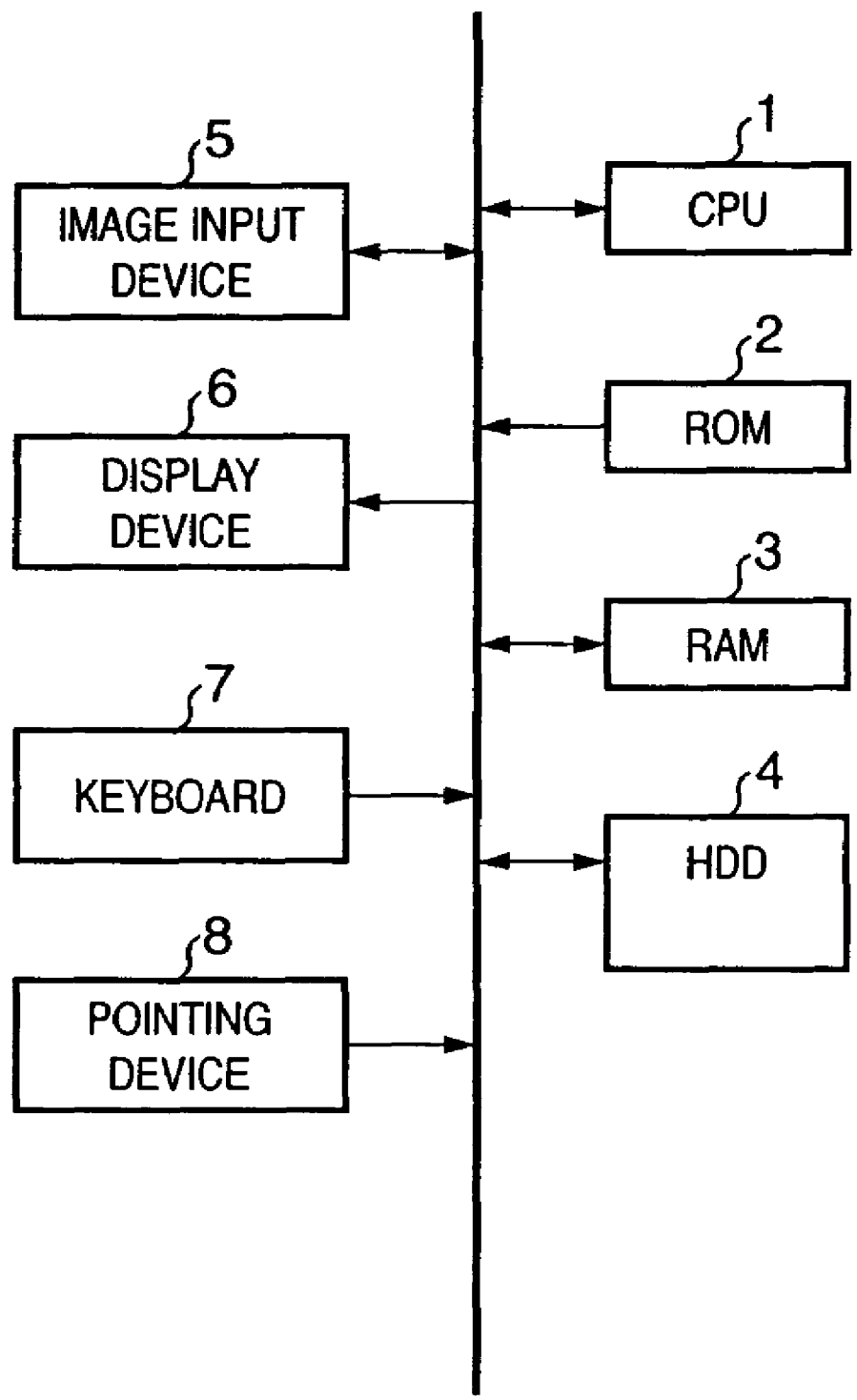
FIG. 11 is a block diagram showing an apparatus according to the embodiment.

FIG. 11 is a block diagram showing an information processing apparatus which processes an image in the first embodiment. In FIG. 11, reference numeral 1 denotes a CPU which controls the whole apparatus; 2, a ROM which stores a boot program, BIOS, and the like; and 3, a RAM used as a work area for the CPU 1. An OS, image processing program, or the like is loaded to the RAM 3 and executed. Reference numeral 4 denotes a hard disk device serving as an external storage device for storing an OS, image processing program, and image data files (including files before and after processing); 5, an image input device such as an image scanner, a digital camera, a storage medium (memory card, flexible disk, CD-ROM, or the like) which stores an image file, or an interface for downloading an image from a network; 6, a display device which displays an image and provides GUI for performing various operations; 7, a keyboard; and 8, a pointing device used to designate a desired position on a display screen and select various menus.

The apparatus having the above arrangement is powered on, and the OS is loaded to the RAM 3. An image processing program in the first embodiment is loaded to the RAM 3 and executed in accordance with a user instruction or automatic activation setting.

Figure 1:
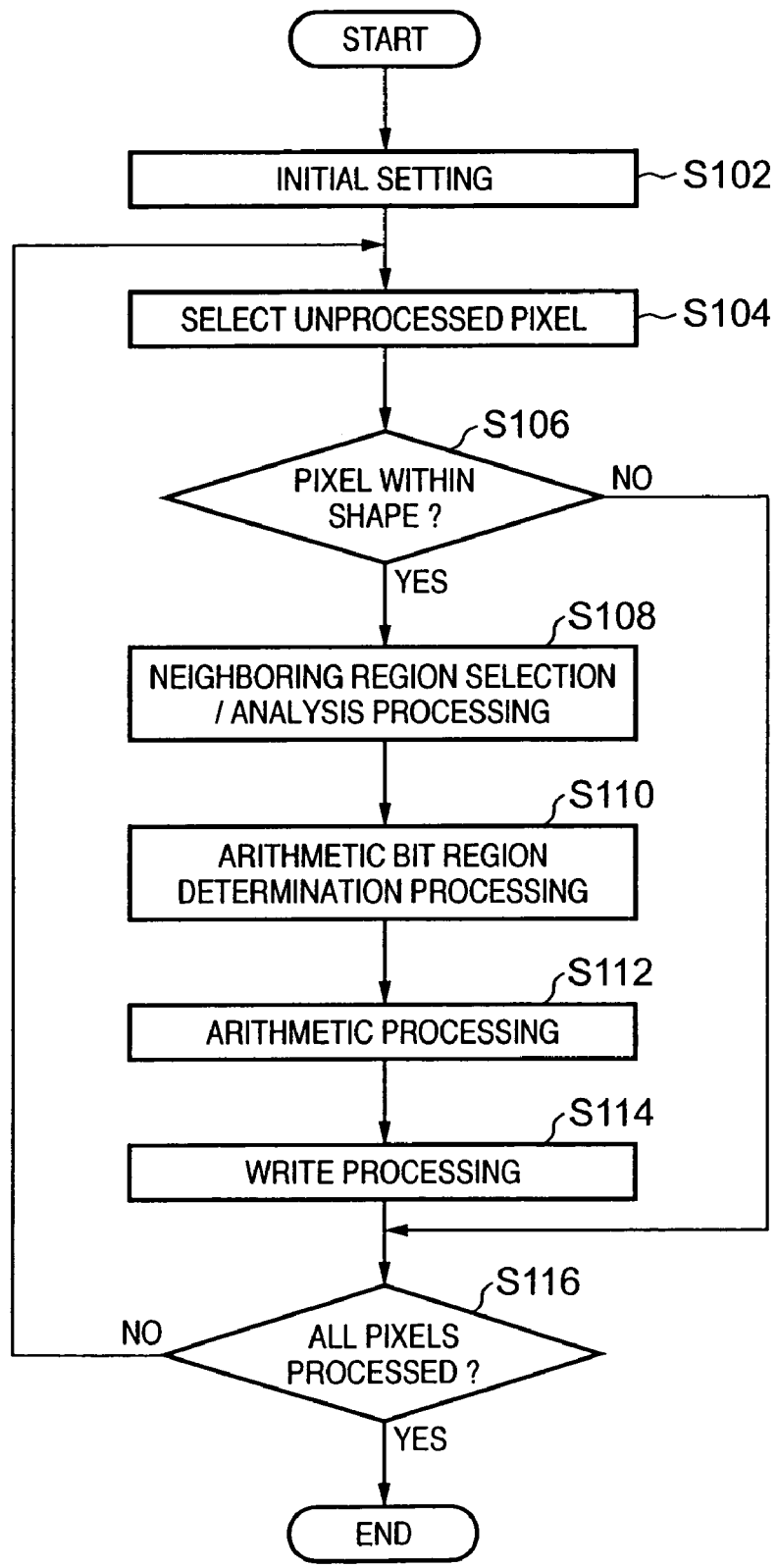
FIG. 1 is a flow chart showing reversible noise addition processing according to the first embodiment.

FIG. 1 is a flow chart showing processing of a reversible noise addition apparatus according to the first embodiment of the present invention.

In the initial state in step S102 of FIG. 1, an original image I comprised of a plurality of pixels each having a pixel position and pixel value, watermark image shape information M comprised of a pixel position representing the shape of an embedded image, a random number key R for generating a predetermined serial bit sequence expressed by binary numbers, an arithmetic bit region determination table T_N which defines a bit region subjected to arithmetic processing among pixel values, a visible intensity value S which defines the intensity of noise to be added, a neighboring pixel selection method NS, and a neighboring pixel analysis method NA are set. The storage area of an output image W is ensured in the RAM.

The original image I may be an image directly input from the image input device 5 or an image file temporarily saved in the HDD 4. The image shape information M is information stored in the HDD 4 in advance, but may be freely created by the user. As for the random number key R, a function (program) for generating a random number may be executed. The arithmetic bit region determination table T and visible intensity value S may be input from the keyboard or the like, or may be saved as a file in the HDD in advance. The output destination of the output image W is the HDD 4. The serial bit sequence may be fixed for the entire image, but is changed in accordance with the image embedding position on the basis of the random number key R in order to enhance security.

In step S102, specific pixels in the original image I are sequentially selected prior to the following processing. As the selection order, the upper left corner is set as the start position, and one horizontal line is scanned right from the start position. At the end of the line, the next line (second line) is scanned from left to right. This scanning is repeated. This also applies to noise removal.

In step S104, an unprocessed pixel is selected from the input image (in the initial state, the upper left corner). In step S106, a position in watermark image shape information that corresponds to the selected pixel position in the original image, i.e., whether the pixel position is position "1" in image shape information (in this embodiment, a watermark image is embedded at a white pixel position, as described above) is determined. If the current pixel is a pixel subjected to embedding (multiplexing), the pixel position information is transferred to step S108. If the current pixel is located at a position other than "1" in the image shape information, i.e., at position "0", processing for the pixel ends.

Processing advances to step S108 to determine a region near the embedding target pixel on the basis of the initially set neighboring region selection method NS. The pixel value in the neighboring region is analyzed in accordance with the initially set neighboring analysis method NA, generating a neighboring region analysis value. The neighboring region analysis value is comprised of a neighboring region pixel value serving as the predicted value of the embedding target pixel that is obtained from the neighboring region, and a neighboring region characteristic value containing the frequency characteristic of the neighboring region and the like (which will be described in detail later).

Instep S110, an arithmetic bit region to be processed by arithmetic processing in step S112 is determined on the basis of the neighboring region analysis value generated in step S108 and the visible intensity value S.

In step S112, arithmetic processing is performed between the bit of the arithmetic bit region determined in step S110 and a serial bit sequence generated from the random number key R input by initial setting in step S102. This arithmetic processing must be reversible. As arithmetic processing, the first embodiment adopts exclusive-OR arithmetic processing. Arithmetic processing includes all reversible arithmetic processes such as modulo addition and modulo multiplication.

In step S114, write processing of writing the value of the bit region of a corresponding input pixel in the output image W by the value of the processed arithmetic bit region is executed.

In step S116, whether all pixels have been processed is determined. If NO in step S116, processing returns to step S104 to continue the above-described processing until all pixels have been processed.

The outline of reversible noise addition processing according to the first embodiment has been described.

Figure 2:
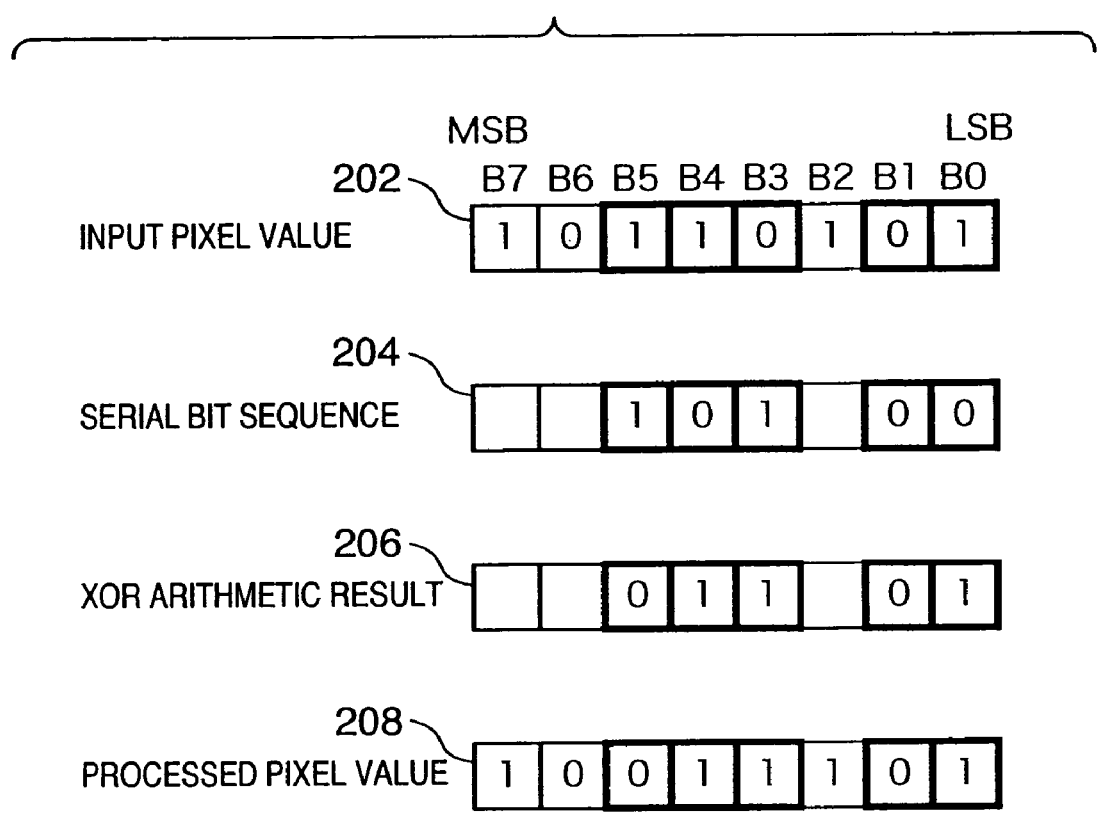
FIG. 2 is a view showing arithmetic processing contents.

FIG. 2 shows an example of operation in arithmetic processing according to the first embodiment. Reference numeral 202 denotes an input pixel value; 204, a serial bit sequence generated from the random number key R; 206, an exclusive-OR (XOR) of an input pixel and a corresponding bit position in a serial bit sequence; and 208, an output pixel having undergone arithmetic processing. A bit position surrounded by a thick frame is an arithmetic bit region.

The serial bit sequence 204 also serves as a key for decoding a pixel. A serial bit sequence corresponding to a region other than the arithmetic bit region is not required.

A value in the thick frame in the exclusive-OR 206 is the arithmetic processing result (in this case, exclusive-OR) of the arithmetic bit region of an input pixel and the bit region of a corresponding serial bit sequence.

The output pixel 208 is a result of writing the arithmetic processing result 206 as the value of the arithmetic bit region of a corresponding input pixel.

In FIG. 2, the difference between the pixel value of the arithmetic result and the original pixel value (B means a binary number in the following description) is $$10011101(B) - 10110101(B) = 157 - 181 = -24$$

This means that the pixel value of interest has changed by "−24".

When 5 bits B5, B4, B3, B1, and B0 (it should be noted that B2 is excluded) form an arithmetic bit region and the entire arithmetic bit region is inverted, a pixel value change of $2^5+2^4+2^3+2^1+2^0=32+16+8+2+1=59$ ($x^y$ represents the yth power of x) is realized at maximum.

In this manner, the arithmetic bit region determines the maximum change amount (Δmax) of the pixel value of an embedding target pixel. In the first embodiment, bit information belonging to the arithmetic bit region is processed to embed reversible noise. The arithmetic bit region is an element which determines the intensity of added reversible noise. In the first embodiment, the arithmetic bit region is determined on the basis of analysis of a neighboring region comprised of one or a plurality of pixel values near an embedding target pixel.

Neighboring region analysis processing and a neighboring region analysis value will be explained in detail.

In the first embodiment, an arithmetic bit region subjected to arithmetic processing is determined on the basis of analysis of a neighboring region comprised of adjacent pixel values or the like in order to embed a visible digital watermark in an embedding target pixel.

Generally in a natural image, the pixel values of adjacent pixels have a high correlation. That is, adjacent pixel positions often have almost the same pixel value. In a natural image, a change amount between neighboring pixels that can be perceived by the human eye is proper as a change amount of an embedding target pixel that can be perceived by the human eye.

The human visual characteristic to luminance is nonlinear such that a change in luminance is hardly perceived at a high luminance and easily perceived at a low luminance.

In the first embodiment, the maximum change amount $\Delta$max of an embedding target pixel is finely set by referring to a neighboring pixel highly correlated to the embedding target pixel and considering the human visual characteristic. Addition of noise which is perceived almost similarly at any grayscale (luminance) of an original image is realized.

A region constituted by neighboring pixels which determine an arithmetic bit region for embedding reversible noise in an embedding target pixel will be called a "neighboring region".

The neighboring region may be constituted by one or a plurality of pixels. The neighboring region suffices to be a region predicted to have a high correlation with an embedding target pixel, and need not always be adjacent to the embedding target pixel.

Analysis of the pixel in the neighboring region may utilize not only a pixel value but also a statistical characteristic such as the frequency characteristic of a pixel value in the neighboring region or the variance of a pixel value in the neighboring region.

The arithmetic region determination table T_N in which the maximum change amount $\Delta$max is set large at a high-frequency portion or in a texture region may be designed. In this case, reversible noise which can be easily, uniformly recognized by the human eye even in the high-frequency-component region or texture region can be added.

Neighboring region selection/analysis processing according to the first embodiment will be explained in detail.

FIG. 5 is a block diagram showing the internal arrangement of a neighboring region selection/analysis unit which executes neighboring region selection/analysis processing in step S108 of FIG. 1. The neighboring region selection/analysis unit comprises a neighboring region selection unit 502 and neighboring region analysis unit 504.

The neighboring region selection unit 502 receives image information (pixel position and pixel value), position information of an embedding target pixel, and the neighboring region selection method NS. The neighboring region selection unit 502 determines a neighboring region on the basis of the pieces of input information. The neighboring region may not be fixed in the entire image, but may be changed in accordance with the pixel position or predetermined key information.

The neighboring region selection unit 502 outputs neighboring region information (pixel position, pixel value, and the like) to the neighboring region analysis unit 504 on the output stage.

The neighboring region analysis unit 504 receives the neighboring region information (pixel position, pixel value, and the like) and the neighboring region analysis method NA, and analyzes the pixel value of the neighboring region on the basis of the pieces of input information. The neighboring region analysis unit 504 outputs a neighboring region analysis value (neighboring region pixel value and neighboring region characteristic value).

Processing of the neighboring region selection/analysis means will be described in detail with reference to FIG. 6.

Figure 6:
FIG. 6 is a view showing the relationship between an original image and a noise-added image according to the first embodiment.

FIG. 6 is a view showing part of an 8-bit grayscale input image 601 and an output image 602 (noise-added image) containing a visible digital watermark.

Pixels (pixels 13a, 14a, 15a, 18a, 19a, and 20a) surrounded by thick frames in FIG. 6 falls within the watermark image shape, and are pixels subjected to reversible noise embedding.

In the first embodiment, the arithmetic bit region of the pixel 13a is selected on the basis of a region near the pixel 13a. The neighboring region is determined using the neighboring region selection means 502.

For descriptive convenience, the neighboring region selection means 502 in the first embodiment selects a pixel left to a pixel of interest. When the pixel 13a is a pixel of interest subjected to noise addition processing, a left adjacent pixel 12a (pixel value "112") is selected as a neighboring region. Selection of a plurality of pixel regions as neighboring regions will be described later.

The pixel 12a (pixel value "112") is input to the neighboring region analysis unit 504. In FIG. 6, for descriptive convenience, the neighboring region analysis means 504 directly outputs the input pixel value "112" as a neighboring region analysis value.

In arithmetic bit region determination processing, the arithmetic bit region of the embedding target pixel 13a is determined on the basis of the neighboring region analysis value obtained by the preceding neighboring region selection/analysis processing.

The first embodiment determines an arithmetic bit region as follows.

Figure 3:
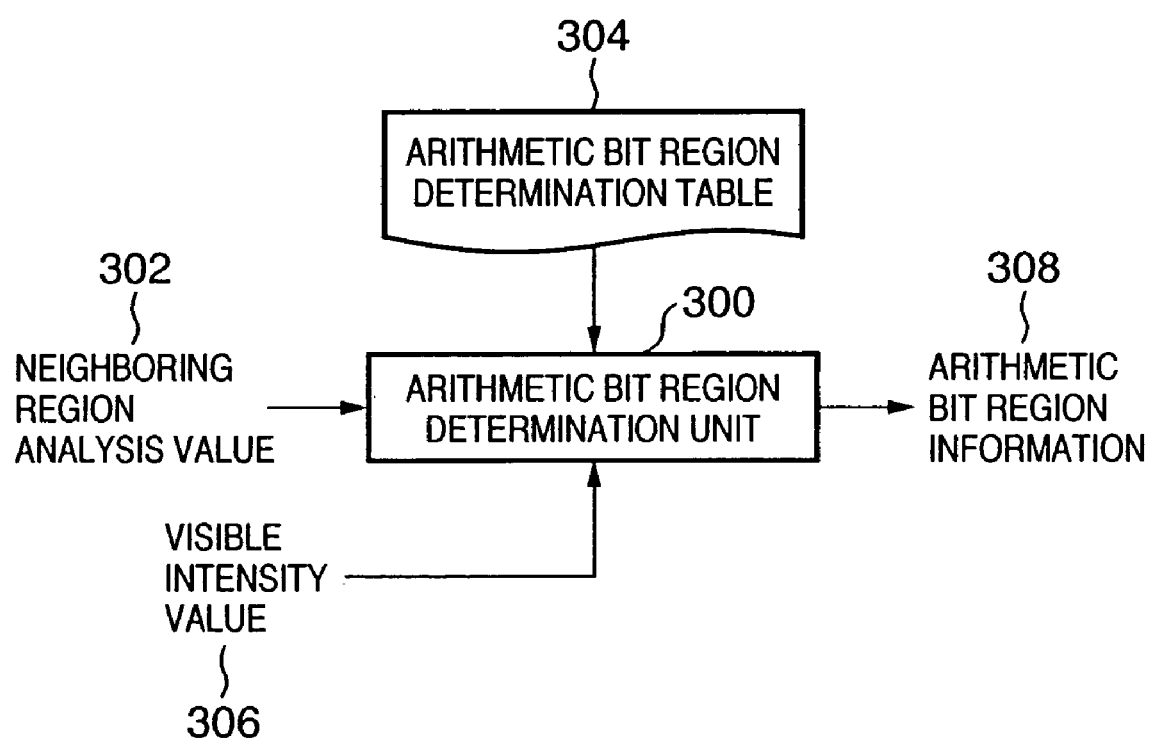
FIG. 3 is a block diagram showing the internal arrangement of an arithmetic bit region determination unit which executes arithmetic bit region determination processing.

FIG. 3 is a block diagram showing an arithmetic bit region determination unit which executes arithmetic bit region determination processing in step S110.

An arithmetic bit region determination unit 300 receives a neighboring region analysis value 302 input from neighboring region selection/analysis processing in step S108, an initially set visible intensity value S (306), and an arithmetic bit region determination table T_N 304.

The arithmetic bit region determination unit 300 determines the arithmetic bit region of an embedding target pixel on the basis of the neighboring region analysis value 302, arithmetic bit region determination table T_N 304, and visible intensity value S 306, and outputs the arithmetic bit region as arithmetic bit region information 308.

The arithmetic bit region determination table T_N will be explained.

The arithmetic bit region determination table T_N is a lookup table used to determine an arithmetic bit region by arithmetic bit region determination processing in step S110.

FIGS. 4A and 4B show examples of the arithmetic bit region determination table T_N which corresponds to the neighboring region analysis value (the pixel value of the pixel in the neighboring region). FIG. 4A shows a table for the visible intensity S=1, and FIG. 4B shows a table for the visible intensity S=2. As the value (luminance) in the neighboring pixel region is smaller, the arithmetic bit region at a pixel of interest shifts to a lower bit. This is because, in a natural image (grayscale image obtained by a digital camera or scanner), the correlation between a pixel of interest and a neighboring pixel is high, in other words, the pixel of interest and neighboring pixel have almost the same luminance, and the human visual characteristic to luminance is nonlinear such that a change in luminance is hardly perceived at a high luminance and easily perceived at a low luminance.

In FIGS. 4A and 4B, reference numeral 401 denotes a neighboring region analysis value (FIGS. 4A and 4B show only a neighboring region pixel value for descriptive convenience); 402, an arithmetic bit region of an embedding target pixel that corresponds to the neighboring region analysis value (in FIGS. 4A and 4B, a bit position "Y" is an arithmetic bit region); and 403, a maximum change amount $\Delta$max calculated from the arithmetic bit region. A bit having no "Y" is not changed.

As shown in FIGS. 4A and 4B, the arithmetic bit region shifts downward as a bit position for the visible intensity S=2 with respect to the visible intensity S=1. This means that the original image is less changed for the visible intensity S=2, i.e., degradation of the image quality of the original image is suppressed.

As described above, in the arithmetic bit region determination table T_N, the neighboring region analysis value (in FIGS. 4A and 4B, the neighboring region pixel value calculated from the neighboring region) and the visible intensity value S have values which correspond to the arithmetic bit region. The arithmetic bit region determination means 300 selects either arithmetic bit region determination table in accordance with the visible intensity S. The arithmetic bit region determination unit 300 looks up the selected arithmetic bit region determination table T_N, and reads and outputs an arithmetic bit region which corresponds to the input neighboring region analysis value 302 and visible intensity value S 306.

In arithmetic processing of step S112, bit calculation is executed between a serial bit sequence as shown in FIG. 2 and the bit of the arithmetic bit region in the arithmetic bit region determined by the above-described method. In write processing of step S114, the arithmetic result in step S112 is written in a corresponding arithmetic bit region of an output image.

Figure 7:
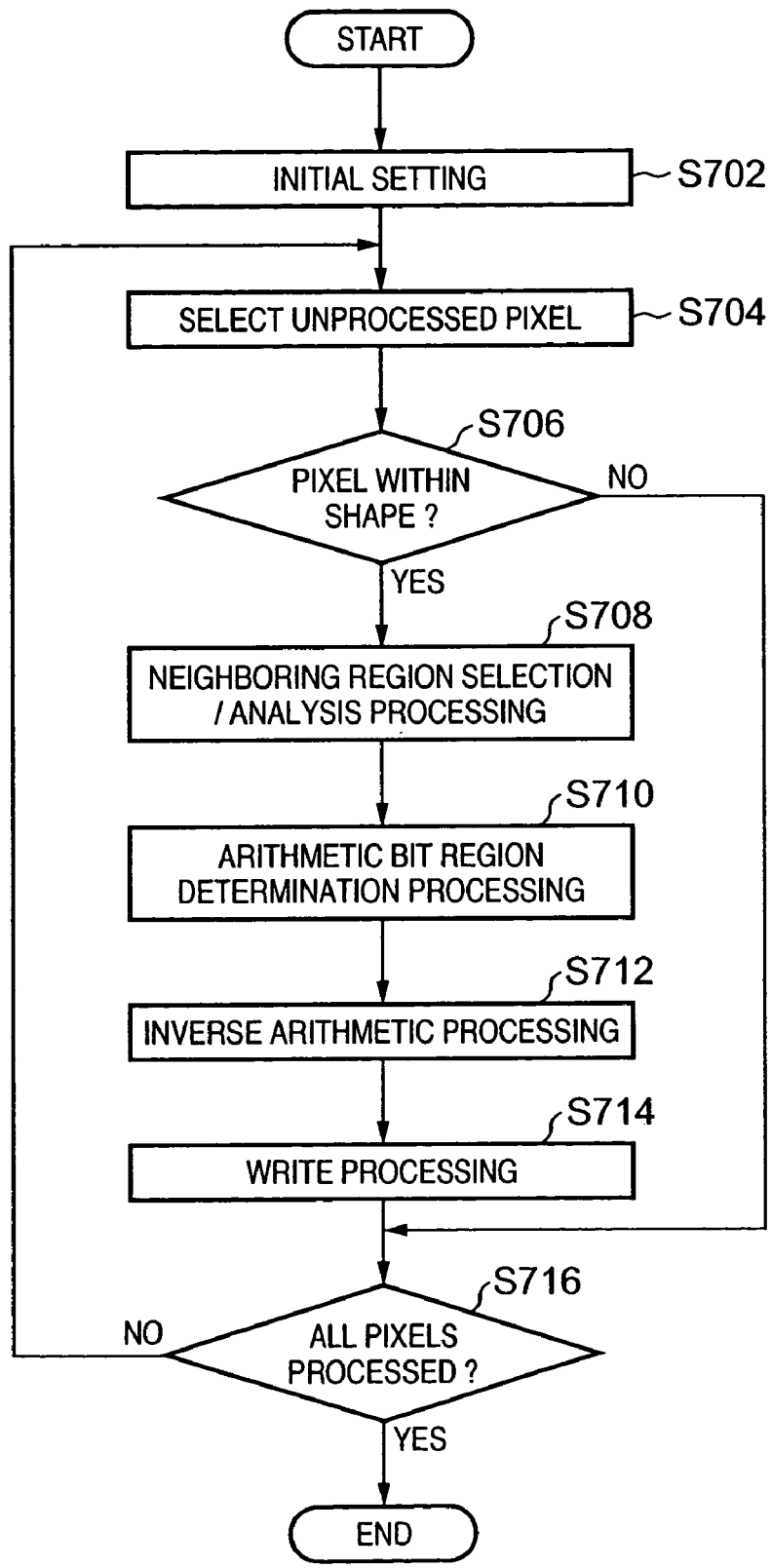
FIG. 7 is a flow chart showing reversible noise removal according to the first embodiment.

The outline of reversible noise removal processing according to the first embodiment will be briefly described with reference to FIG. 7. The apparatus arrangement is substantially the same as that of the apparatus which embeds noise, and a detailed description thereof will be omitted.

In initial setting of step S702, a reversible noise-embedded image W comprised of a plurality of pixels each having a pixel position and pixel value, watermark image shape information M comprised of a pixel position representing the shape of an embedded image, a random number key R for generating a predetermined serial bit sequence expressed by binary numbers, an arithmetic bit region determination table T_N which defines a bit region subjected to arithmetic processing among pixel values, and a visible intensity value S which defines the intensity of a visible digital watermark are input. An output image E is so set as to be identical to the input image W (a copy of the input image W is generated and used as the output image E).

The watermark image shape information M, random number key R, arithmetic bit region determination table T_N, and visible intensity value S are used as key information for removing reversible noise.

In step S704, an unprocessed pixel of the input image is selected.

In step S706, whether noise is multiplexed on the selected pixel is determined on the basis of the pixel position in image shape information (position "0" or "1"). If NO in step S706, processing for the pixel ends.

If YES in step S706, processing advances to step S708 to determine a region (left adjacent pixel in the first embodiment) near the embedding target pixel on the basis of the initially set neighboring region selection method NS. The pixel value in the neighboring region is analyzed in accordance with the initially set neighboring analysis method NA, generating a neighboring region analysis value.

Instep S710, an arithmetic bit region to be processed by arithmetic processing in step S712 is determined on the basis of the neighboring region analysis value generated in step S708 and the visible intensity value S.

In step S712, inverse arithmetic processing is performed between the bit of the arithmetic bit region that is determined in step S710 and a serial bit sequence generated from the random number key R input by initial setting in step S702. This arithmetic processing is inverse arithmetic processing (decoding processing) corresponding to arithmetic processing in embedding. In the first embodiment, an exclusive-OR is calculated for the arithmetic bit region by using the same serial bit as that used in embedding. As a result, the pixel value can be completely restored to an original pixel value.

In step S714, write processing of writing, in a corresponding pixel of the output image E, the arithmetic bit region value obtained by processing the bit region value of the input pixel is executed.

In step S716, whether all pixels have been processed is determined. If NO in step S716, processing returns to step S704 to continue the above-described processing until all pixels have been processed.

The operation of the reversible noise removal apparatus according to the first embodiment has been described.

The processing contents of the first embodiment have been described, and a concrete example will be explained for easy understanding of the processing contents.

To realize addition of completely reversible noise, several conditions are necessary for the neighboring region selection method. That is, in inverse arithmetic processing, an arithmetic bit region having undergone arithmetic processing in embedding must be correctly recognized. The neighboring region selection method must select a neighboring region so as to refer to the pixel value of a neighboring region used to determine an arithmetic bit region in inverse arithmetic processing (removal of reversible noise).

There are many neighboring region selection methods which satisfy the above conditions. For example, a pixel left adjacent to an embedding target pixel is referred to as a neighboring region, and reversible noise is added/removed to/from the pixel of interest. When the pixel left adjacent to the pixel of interest is used as a neighboring region, the neighboring region must be completely reconstructed to an original image. This can also be achieved by many methods. According to one method, the leftmost vertical line of image shape information is changed to "0", in other words, is excluded from the noise embedding target. As a result, the start pixel remains original and satisfactorily functions as a neighboring region in noise removal of each line in the left-to-right direction. According to another method, when the start pixel of each line is permitted to be a noise multiplexing target, no neighboring region exists, and the arithmetic bit region is fixed.

Embedding will be briefly explained. In FIG. 6, the visible intensity S=1 is set, and the pixel 13a is determined to be an embedding target pixel. At this time, the left adjacent pixel 12a (pixel value "112") is selected and analyzed as a neighboring region. As a result, "112" is output as the neighboring region pixel value of the neighboring region analysis value.

The arithmetic bit region of the pixel 13a is determined using the determined arithmetic bit region determination table T_N (table in FIG. 4A because of the visible intensity S=1). Since the neighboring region value is "112", B4, B3, and B1 in the pixel 13a are determined as arithmetic bits.

A pixel value "126" is calculated for the pixel 13a (pixel value "116") by arithmetic processing (exclusive-OR) between the bit values in the arithmetic bit region of the pixel 13a and a serial bit sequence. The pixel value "126" is written in the pixel 13a of the output image 602.

The processing target shifts to the pixel 14a. At this time, the arithmetic bit region of the pixel 14a is determined using the arithmetic bit region determination table T_N by referring to the left adjacent pixel 13a (pixel value "116" before change) of the input image 601. A pixel value "98" is calculated for the pixel 14a (pixel value "114") by arithmetic processing between the arithmetic bit region and the serial bit sequence. The pixel value "98" is written in the pixel 14a of the output image 602.

The pixel values of left adjacent pixels before change are sequentially read out to embed reversible noise.

A step of removing reversible noise embedded in the above-described way will be explained. In removing noise, pieces of necessary information such as a noise-multiplexed image, visible intensity, image shape information, and random number key have already been input, as described above.

A case wherein the pixel 13a (pixel value "126") is a removal target pixel will be explained. It should be noted that reconstruction processing has been completed up to a left adjacent pixel position.

The left adjacent reconstructed pixel 12a (pixel value "112") of the output image 602 is selected and analyzed as a neighboring region. As a result, "112" is output as the neighboring region pixel value of the neighboring region analysis value.

The arithmetic bit region of the pixel 13a is determined using the arithmetic bit region determination table T_N (selected by the visible intensity S). A restored pixel value "116" is calculated for the pixel 13a (pixel value "126" after watermark embedding) by arithmetic processing between the bit value of the arithmetic bit region and a serial bit sequence. The pixel value "116" is written in the pixel 13a of the output image 601 (original image).

The removal target pixel shifts to the pixel 14a. In this case, not the left adjacent pixel 13a of the input image 601 but the left adjacent reconstructed pixel 13a (restored pixel value "116") in the reconstructed output image 602 is selected and analyzed. As a result, "116" is output as the neighboring region pixel value of the neighboring region analysis value.

The arithmetic bit region of the pixel 14a is determined using the arithmetic bit region determination table T_N. A pixel value "114" is calculated for the pixel 14a (pixel value "98") by arithmetic processing between the bit value of the arithmetic bit region and the serial bit sequence. The pixel value "114" is written in the pixel 14a of the output image 602 (original image).

The pixel values of adjacent reconstructed pixels are sequentially selected and analyzed to determine the same arithmetic bit region as that in embedding, completely removing reversible noise.

In the above description, a pixel left adjacent to an embedding target pixel is selected as a neighboring region for descriptive convenience. Alternatively, a pixel on an immediately preceding line at the same position in the main scanning direction may be selected as a neighboring region. In short, a reconstructed pixel is referred to.

Instead of using one pixel as a reference region, a region of a plurality of pixels may be selected and analyzed as a neighboring region.

For example, in FIG. 6, the neighboring region selection unit selects the pixels 7a, 8a, and 12a as a region near the pixel 13a of interest. The neighboring region analysis unit predicts the pixel value of the embedding target pixel 13a from the pixel values of the pixels 7a, 8a, and 12a, and sets the predicted value as a neighboring region pixel value.

Alternatively, the neighboring region selection unit may select four left pixels 1a, 2a, 6a, and 7a as a region near the pixel 13a. In this case, the neighboring region analysis means may also calculate a variance, frequency coefficient, and the like in the neighboring region, and set them as neighboring region characteristic values. An arithmetic bit region corresponding to the variance, frequency coefficient, and the like is defined in the arithmetic bit region determination table T_N.

In the arithmetic bit region determination table T_N in FIG. 4A (for the visible intensity S=1), the arithmetic bit region corresponding to an input pixel value "112" as a neighboring region analysis value (neighboring region pixel value) is defined by B4, B3, and B1. At this time, the maximum change amount (Δmax) is calculated into $2^4+2^3+2^1=26$ ($x^y$ represents the yth power of x). For example, when the pixel value of an embedding target pixel is 112, B4, B3, and B1 of 112 are 1, 0, and 0. The change amount has a width of $2^3+2^1=10$ in the positive direction and $2^4=16$ in the negative direction.

The reversible noise addition method of the first embodiment can finely set an arithmetic bit region on the basis of a neighboring region pixel value almost equal to the value of an embedding target pixel and a neighboring region analysis value obtained from a neighboring region characteristic value near the embedding target pixel.

Addition of reversible noise to all the pixels of an input image by using the reversible noise addition apparatus of the first embodiment will be described. When a pixel near the edge of an input image is selected as an embedding target pixel, no neighboring region may exist. Several examples of a method coping with the absence of any neighboring region will be explained.

For example, when a pixel having no neighboring region near the edge of an input image is an embedding target pixel, addition of reversible noise may stop, as described above. In removing reversible noise from the pixel having no neighboring region, it is known that no reversible noise is added. Removal of reversible noise need not be executed until the neighboring region is obtained.

When a pixel having no neighboring region near the edge of an input image is an embedding target pixel, arithmetic bit processing may be done for a fixed arithmetic bit region determined only in accordance with the visible intensity value S. In removing reversible noise from the pixel having no neighboring region, inverse arithmetic processing is performed for the arithmetic bit region determined only in accordance with the visible intensity value S, thereby removing reversible noise.

As described in detail above, an arithmetic bit region is determined in accordance with the neighboring region analysis value for the pixel value of an input image which attains the size of a neighboring region determined by the neighboring region selection method NS.

As also described above, the human visual characteristic is more sensitive to a change in luminance value at a lower luminance value and less sensitive to a change in luminance value at a higher luminance value. The arithmetic bit region (maximum change amount Δmax) is preferably designed in consideration of the human visual characteristic. From this viewpoint, according to the first embodiment, the arithmetic bit reaches a high bit position for a high-luminance neighboring region, and the arithmetic bit region is comprised of a low bit for a low-luminance neighboring region, regardless of the visible intensity S=1 or 2. Visible additional information can therefore be multiplexed while maintaining an atmosphere almost identical to an original image.

Uniform color spaces CIE 1976 L*u*v* and CIE 1976 L*a*b* (to be referred to as an L*a*b* color space hereinafter) in which a color change in the space coincides with a change in color appearance have been recommended by CIE since 1976.

The uniform color space is also effective for determining the arithmetic bit region (maximum change amount Δmax).

The first embodiment can set the pixel value change amount such that the noise amount added by arithmetic processing changes in accordance with the image grayscale in a region represented by watermark image shape information of an original image while maintaining the feature of an original image. In addition, no original image is required for removing added noise. Introduction of high-security cryptography to arithmetic processing makes it difficult to remove added noise.

The arithmetic bit region determination table T_N is used to determine an arithmetic bit region. An arithmetic bit region determination function F expressed by a formula can also be used, and this method also falls within the scope of the present invention.

Concrete examples of this method are as follows.

A server which services images on the Internet is installed. Images containing additional information having undergone processing in FIG. 1, and pieces of specific information (image shape information M, random number key R, arithmetic bit region determination table T, and visible intensity S) for reconstructing the respective images are stored and managed. The user (client) selects and downloads a desired image. The downloaded image contains visible additional information (e.g., a photographer name and photographing date and time), as described above, and can satisfactorily present the atmosphere of the entire image. The user notifies the server that he/she wants to reconstruct the downloaded image into an original image (e.g., by clicking a corresponding button on a browser or the like). The server transmits not the original image itself but pieces of information (image shape information M, random number key R, arithmetic bit region determination table T, and visible intensity value S) which are specific to the image and necessary for reconstruction (this can prevent leakage of the original image). In transmission, these pieces of information are encrypted by a private key, which enhances security. The user PC receives these pieces of information, and performs processing of executing processing shown in FIG. 7.

As for the random number key R, a common function for generating a random number is held in the server and client, instead of transmitting a random number itself. Only an initial parameter for generating a random number is transmitted. If the same parameter is used for all images, all images held by the server can be undesirably reconstructed. To prevent this, the parameter is changed for each image.

The first embodiment adopts two tables for determining an arithmetic bit region, as shown in FIGS. 4A and 4B. Three or more tables may also be adopted. B7 (MSB) and B6 are excluded from the arithmetic bit region. If the visible intensity is further increased or wanted to be increased, these bits can also be contained in the arithmetic region.

The visible intensity S may be set freely by the user or automatically. For example, the visible intensity S may be automatically determined using the range width and central luminance of the luminance distribution (histogram or the like may be created) of an original image as parameters. For example, when the entire original image is dark, the arithmetic bit region in which visible noise is embedded is assigned to a relatively low bit region, and additional information by visible noise may be hardly seen. For the entirely dark image, the arithmetic bit region is set up to a high bit so as to change the image to a high luminance. Accordingly, the visible intensity can be automatically increased.

Second Embodiment

In the first embodiment, noise addition processing is done for each pixel. In the second embodiment, reversible noise is added to an image compression-coded by JPEG, JPEG 2000, or the like.

A compression coding method such as JPEG or JPEG 2000 does not define an input color component. In many cases, R (Red), G (Green), and B (Blue) color components are transformed into Y (luminance), Cb (color difference), and Cr (color difference), and then discrete cosine transform or discrete wavelet transform is executed.

A frequency conversion coefficient representing the luminance component of a color image compression-coded by JPEG or JPEG 2000 is used as a visible digital watermark embedding component. Such component can be embedded in a luminance value without any special processing.

In JPEG compression coding, compression coding is performed for each block. For example, a JPEG-compression-coded image has a minimum encoding unit (in general, 8×8 pixels), and basic compression coding processing is done for each unit. To embed a visible digital watermark in a JPEG-compression-coded image, watermark image shape information is set not for each pixel but for the minimum encoding unit. This facilitates applying the method of the first embodiment.

More specifically, in order to transform an image into frequency component data for each 8×8 pixel block, DCT transform is performed. If the pixel block is not located at a position where noise should be multiplexed, general JPEG encoding is done. If the pixel block is determined to be located at the multiplexing position, the same processing as that in the first embodiment is executed for bits which constitute a DC component value obtained as a result of DCT transform. At this time, the visible intensity value S is referred to, similar to the first embodiment. As a neighboring region, a DC component after orthogonal transform of a neighboring pixel block is used.

Figure 8:
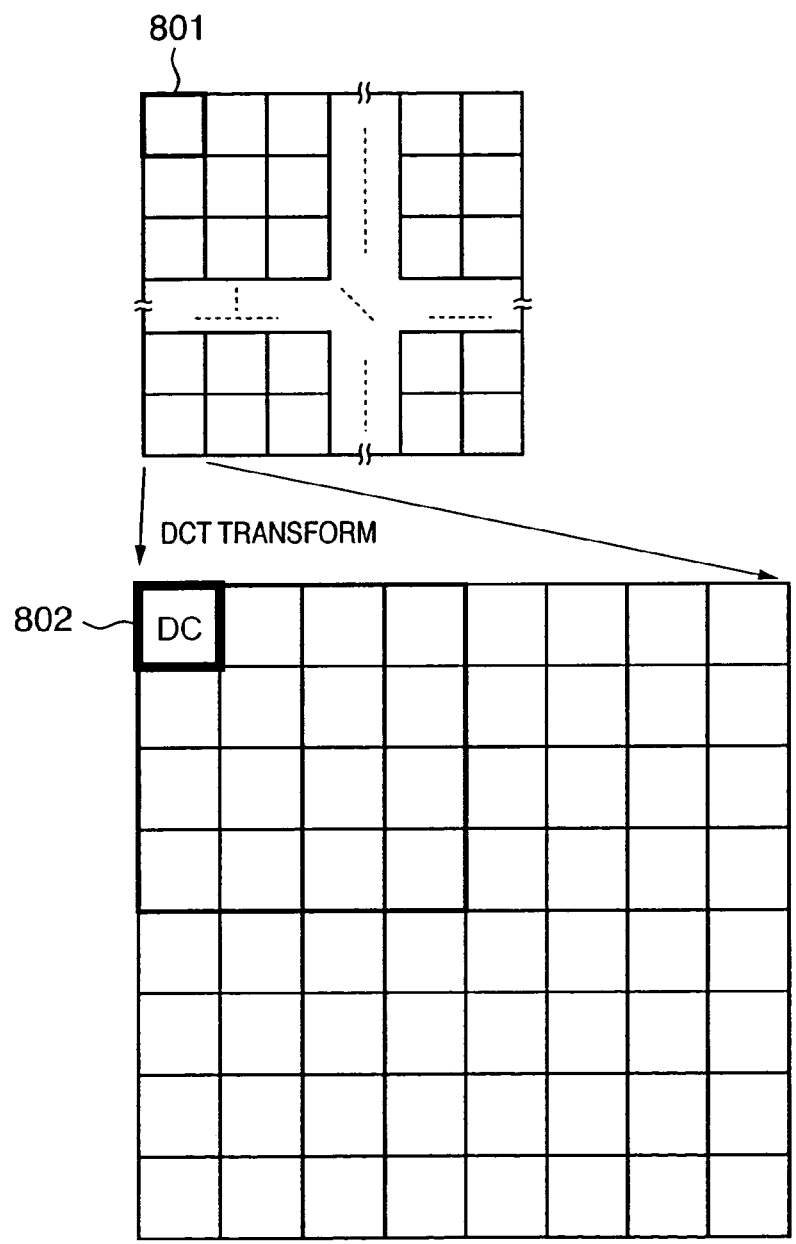
FIG. 8 is a view showing a minimum encoding unit in JPEG compression coding.

In FIG. 8, reference numeral 801 denotes an image block in the minimum encoding unit in JPEG compression coding. For a JPEG-compression-coded image, DCT (Discrete Cosine Transform) is executed within the minimum encoding unit (801). Reference numeral 802 denotes a DC component (average value) of a DCT coefficient obtained for the minimum encoding unit after DCT transform. The remaining 63 coefficients are AC coefficients.

The average value in the minimum encoding unit (801) can be changed by performing arithmetic bit region calculation processing described in the first embodiment for the DC component of the DC coefficient in the minimum encoding unit. Reversible noise can be added to each block.

Assuming that watermark image shape information is information which designates the minimum encoding unit block subjected to embedding, the first embodiment can be applied. As another merit for the first embodiment, image shape information M can be reduced. In JPEG, whether to perform multiplexing for the 8×8 pixel unit is determined. One pixel of image shape information (binary image) corresponds to 8×8 pixels of an original image (the capacity is reduced to 1/64).

To remove noise, whether a block to be processed undergoes noise embedding is determined on the basis of image shape information before inverse DCT transform. If the pixel is determined not to be subjected to noise embedding, the block is decoded by general processing. If the pixel is determined to be subjected to noise embedding, an arithmetic bit region at a DC component is obtained (specified) by looking up an arithmetic bit region determination table T determined by the visible intensity value S. An arithmetic bit region is determined from the restored DC component of a neighboring region by looking up the table. Logical calculation (exclusive-OR calculation according to the first embodiment) with a serial bit sequence generated by a random number is performed to reconstruct the image. In JPEG compression coding, data is discarded by quantization processing, and the image cannot be completely reconstructed into an original image. However, also in the second embodiment, at least an image from which noise is removed to almost an original image can be obtained at the same quality as a decoding result by general JPEG.

As the neighboring region analysis value (neighboring region characteristic value) in the first embodiment, DCT coefficients in a plurality of neighboring minimum encoding unit blocks or another DCT coefficient in the minimum encoding unit serving as an embedding target block may be used. An AC coefficient as an AC component in the minimum encoding unit serving as an embedding target block represents the frequency characteristic of the embedding target block, and can be effectively adopted as the neighboring region analysis value (neighboring region characteristic value).

On the other hand, a JPEG 2000-compression-coded image is compression-coded by dividing the image stepwise by the band from a low frequency to a high frequency by using DWT (Discrete Wavelet Transform) while holding image shape information.

Figure 9:
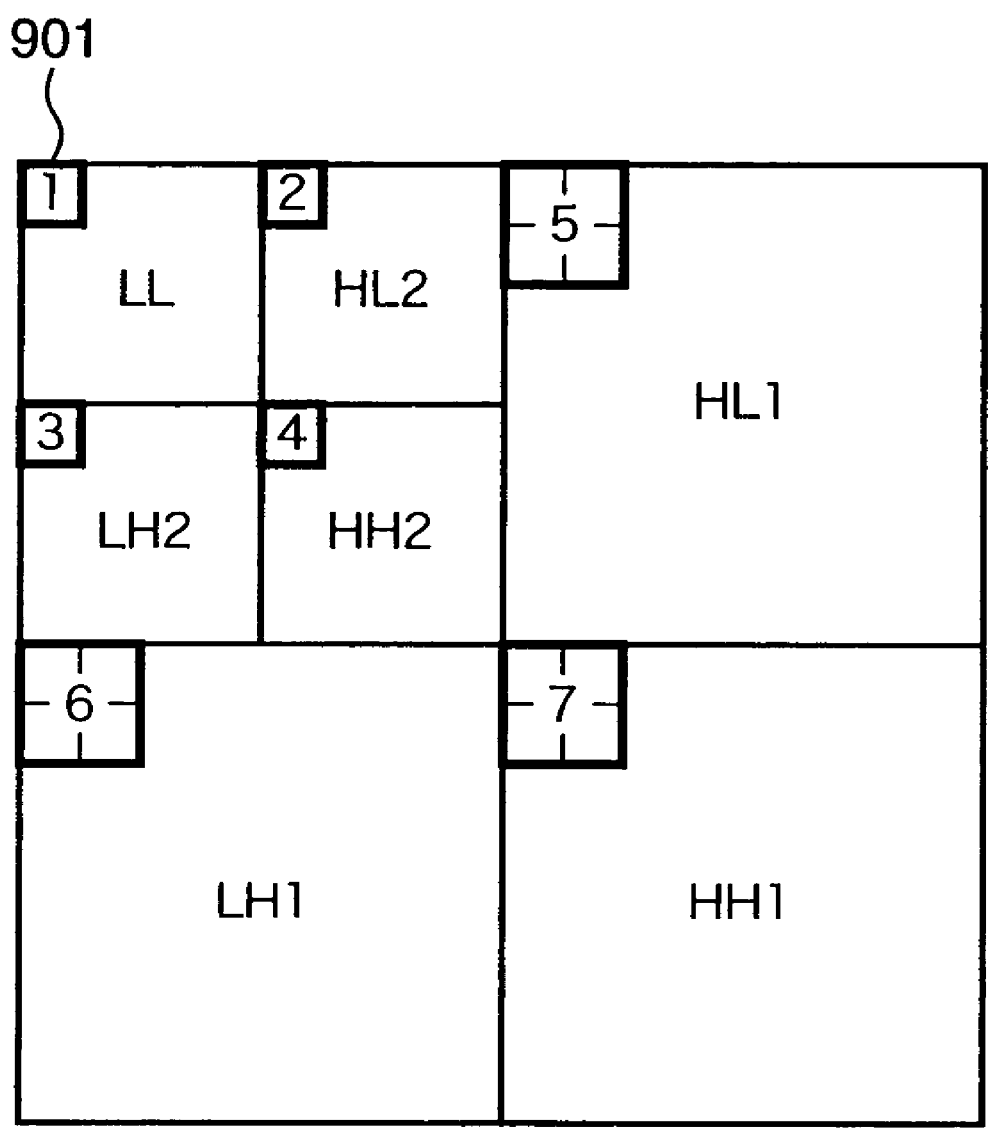
FIG. 9 is a view showing band division by discrete wavelet transform in JPEG 2000 compression coding.

FIG. 9 is a view showing band division by discrete wavelet transform in JPEG 2000 compression coding.

In discrete wavelet transform, low frequency image components which greatly influence an image concentrate on LL, and LL satisfactorily holds the image feature of an original image. If an element used for embedding is the low frequency component (LL) of DWT (Discrete Wavelet Transform), reversible noise can be added relatively similar to the first embodiment.

In FIG. 9, LL is a low-frequency-component subblock as a result of performing DWT twice. All pixels which constitute the subblock LL undergo the same embedding as that in the first embodiment. In this case, the neighboring region to be referred to may be the subblock LL of an adjacent pixel block. Alternatively, the DWT coefficients of other subblocks (subbands) HL2, LH2, HH2, HL1, LH1, and HH1 which constitute a tree structure together with LL in the block of interest may be used as neighboring regions.

Information on the frequency characteristic of an embedding target section in an original image can be obtained from the DWT coefficients of subbands. The DWT coefficients of subbands are effective as a neighboring region characteristic value which determines a visible digital watermark intensity.

When the methods described in the first and second embodiments are applied to the DWT (Discrete Wavelet Transform) coefficient of a JPEG 2000-compression-coded image, an arithmetic bit region determination table must be designed in consideration of the fact that the DWT coefficient takes a positive or negative value.

In a JPEG 2000-compression-coded image, a 1-bit bit plane having the same size as the image size is prepared for ROI (Region Of Interest). (A JPEG 2000 basic encoding system shifts up and encodes only ROI.)

When watermark image shape information is to be presented like a visible digital watermark to the image appreciator in the absence of any ROI, the watermark image shape information may be set in ROI.

For example, visible logotype information representing copyright information is described in ROI. In transmitting image information by content delivery, the logotype information can be first presented to the appreciator, explicitly presenting the copyright holder of the content to the user.

Watermark image shape information has been encoded together with an image as ROI information. Key information necessary to remove reversible noise can be reduced.

Watermark image shape information necessary to remove reversible noise can also be attached to a predetermined position such as the header of an image file. Reconstruction of a noise-added image into an original image requires only necessary key information in addition to the image file, reducing the delivered information amount.

A key (and watermark image shape information) necessary to remove reversible noise has a relatively small information amount, and can be attached to a predetermined position such as the header of an image file. In order to enable only a specific user to remove reversible noise, the key (and watermark image shape information) may be encrypted by predetermined cryptography (e.g., public key cryptography), and attached to a predetermined position such as the header of an image file.

The first embodiment has described only an exclusive-OR (XOR calculation) as cryptography. The present invention can also adopt secret key cryptography such as DES or public key cryptography by collecting a plurality of arithmetic bit regions into a predetermined processing unit (e.g., 64 bits).

In the first embodiment, a neighboring region must have been reconstructed in removing reversible noise from an embedding target pixel. When a region left adjacent to the embedding target pixel is set as a neighboring region, a predetermined number of bits must be collected from the arithmetic bit regions of a plurality of pixels in the vertical direction and encrypted.

In the use of secret key cryptography such as DES belonging to block cryptography of performing processing for each predetermined processing unit, if the number of collected bits does not reach a predetermined processing unit, "0"s or "1"s are padded by a necessary number of bits to satisfy the predetermined unit and then encryption is performed. A bit which cannot be stored at an original pixel position may be attached to a predetermined file position such as a header.

Alternatively, cryptography belonging to stream cryptography (belonging to secret key cryptography) capable of processing for one to several bits may be employed.

In this case, in the first embodiment, not a random number key, but a secret key for secret key cryptography, or a public key in embedding and private key in extraction for public key cryptography are input by initial setting.

The second embodiment has exemplified DES as cryptography, but may adopt another secret key cryptography such as AES, FEAL, IDEA, RC2, RC4, RC5, MISTY, Caesar cryptography, Viginere cryptography, Beaufort cryptography, Playfair cryptography, Hill cryptography, or Vernam cryptography.

The second embodiment has exemplified a still image, but the same principle can also be applied to a moving image. For example, in MPEG compression coding, reversible noise can be relatively easily embedded using an intermediate frame as an embedding target. In Motion JPEG 2000, reversible noise can be repetitively embedded by the same method as that of JPEG 2000 compression coding in the time frame direction. Hence, addition of reversible noise to a moving image also falls within the scope of the present invention.

The present invention has mainly described addition of reversible noise corresponding to the pixel value of an image. A visible digital watermark can also be embedded by adding strong noise to watermark image shape information. Embedding of a visible digital watermark using the above-described method of the present invention also falls within the scope of the present invention.

As is apparent from the above embodiments, most of the embodiments can be realized by software. In general, when a computer program is installed into a general-purpose information processing apparatus such as a personal computer, a computer-readable storage medium such as a floppy® disk, CD-ROM, or semiconductor memory card is set in the apparatus to execute an install program or copy the program to the system. Such computer-readable storage medium also falls within the scope of the present invention.

An OS or the like running on the computer performs part or all of processing. Alternatively, program codes read out from the storage medium are written in the memory of a function expansion board inserted into the computer or the memory of a function expansion unit connected to the computer, and the CPU of the function expansion board or function expansion unit performs part or all of actual processing on the basis of the instructions of the program codes. Also in this case, functions equal to those of the embodiments can be realized, the same effects can be obtained, and the objects of the present invention can be achieved.

As described above, according to the embodiments, an input image and key are input, and some of the building values of the building elements of the input image are referred to for the building values of the building elements of the input image. Calculation based on the key is executed to change the building values. Reversible noise can be embedded in an original image with high security in accordance with the feature of the input image, satisfactorily protecting copyrights.

The reversible noise-embedded image and key are input, and calculation reverse to the above calculation is executed. As a result, the reversible noise can be removed to reconstruct the original image.

As has been described above, according to the present invention, while the atmosphere of multilevel image data subjected to embedding is maintained, noise can be multiplexed on the image data to reversibly embed visible additional information with a noise-multiplexed distribution. By removing the additional information, an original image or an image almost identical to the original image can be reconstructed.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus which converts multilevel image data into frequency component data for each pixel block of a predetermined size to compression-code the multilevel image data, and multiplexes noise on the multilevel image to embed visible additional information with a noise-multiplexed distribution, comprising:

input means for inputting, as the additional information, information representing whether or not to multiplex noise for each pixel block or the predetermined size;

determination means for determining on the basis of the input additional information whether a pixel block of interest is located at a position where noise is to be multiplexed;

specifying means for, when said determination means determines that the pixel block of interest is located at the position where noise is to be multiplexed, specifying a bit region where noise is to be multiplexed in data constituting a converted low frequency component of the pixel block of interest on the basis of a reference region serving as a converted low frequency component of a neighboring pixel block near the pixel block of interest; and change means for reversibly changing bit information for the bit region in the data of the low frequency component specified by said specifying means.

2. The apparatus according to claim 1, wherein the conversion into the frequency component includes orthogonal transform, and the low frequency component includes a DC component after orthogonal transform.

3. The apparatus according to claim 2, wherein the conversion into the frequency component includes wavelet transform, and the low frequency component includes data of a block of a low frequency component that is generated by wavelet transform a plurality of number of times.

4. The apparatus according to claim 1, further comprising means for setting information on an intensity for multiplexing noise, and said specifying means specifies the bit region where noise is to be multiplexed at the low frequency component of the pixel block of interest on the basis of the set information on the intensity and the reference region.

5. An image processing apparatus which converts multilevel image data into frequency component data for each pixel block of a predetermined size to compression-code the multilevel image data, and multiplexes noise on the multilevel image to embed visible additional information with a noise-multiplexed distribution, comprising:

input means for inputting, as the additional information, information representing whether or not to multiplex noise for each pixel block of the predetermined size;

determination means for determining on the basis of the input additional information whether a pixel block of interest is located at a position where noise is to be multiplexed;

specifying means for, when said determination means determines that the pixel block of interest is located at the position where is to be multiplexed, specifying a bit region where noise is to be multiplexed in data constituting a low frequency component of the pixel block of interest on the basis of a reference region serving as a converted high frequency component of the pixel block of interest; and change means for reversibly changing bit information for the bit region in the data of the low frequency component specified by said specifying means.

6. An image processing apparatus which removes visible additional information from multilevel image data that is compression-coded by reversibly embedding noise, multiplexing the visible additional information, and converting the data into frequency component data for each pixel block of a predetermined size, comprising:

input means for inputting, as the additional information, information representing whether or not to multiplex noise for each pixel block of the predetermined size;

determination means for determining on the basis of the input additional information whether a pixel block of interest is located at a position where noise is multiplexed;

specifying means for, when said determination means determines that the pixel block of interest is located at the position where noise is multiplexed, specifying a bit region where noise is multiplexed at a converted low frequency component of the pixel block of interest on the basis of a reference region serving as a converted low frequency component of a neighboring pixel block near the pixel block of interest; and reconstructing means for performing conversion inverse to noise multiplexing to reconstruct a state of the bit region at the low frequency component of the pixel block of interest specified by said specifying means into a state before multiplexing.

7. An image processing apparatus which removes visible additional information from multilevel image data that is compression-coded by reversibly embedding noise, multiplexing the visible additional information, and converting the data into frequency component data for each pixel block of a predetermined size, comprising:

input means for inputting, as the additional information, information representing whether or not to multiplex noise for each pixel block of the predetermined size;

determination means for determining on the basis of the input additional information a pixel block of interest is located at a position where noise is multiplexed;

specifying means for, when said determination means determines that the pixel block of interest is located at the position where noise is multiplexed, specifying a bit region where noise is multiplexed at a low frequency component of the block of interest on the basis of a reference region serving as a converted high frequency component of the pixel block of interest; and reconstructing means for performing conversion inverse to noise multiplexing to reconstruct a state of the bit region at the low frequency component of the pixel block of interest specified by said specifying means into a state before multiplexing.

8. An image processing method of converting multilevel image data into frequency component data for each pixel block of a predetermined size to compression-code the multilevel image data, and multiplexing noise on the multilevel image to embed visible additional information with a noise-multiplexed distribution, comprising:

an input step of inputting, as the additional information, information representing whether or not to multiplex noise for each pixel block of the predetermined size;

a determination step of determining on the basis of the input additional information whether a pixel block of interest is located at a position where noise is to be multiplexed;

a specifying step of, when the pixel block of interest is determined in the determination step to be located at the position where noise is to be multiplexed, specifying a bit region where noise is to be multiplexed in data constituting a converted low frequency component of the pixel block of interest on the basis of a reference region serving as a converted low frequency component of a neighboring pixel block near the pixel block of interest; and a change step of reversibly changing bit information for the bit region in the data of the low frequency component specified in the specifying step.

9. An image processing method of converting multilevel image data into frequency component data for each pixel block of a predetermined size to compression-code the multilevel image data, and multiplexing noise on the multilevel image to embed visible additional information with a noise-multiplexed distribution, comprising:

an input step of inputting, as the additional information, information representing whether or not to multiplex noise for each pixel block of the predetermined size;

a determination step of determining on the basis of the input additional information whether a pixel block of interest is located at a position where noise is to be multiplexed;

a specifying step of, when the pixel block of interest is determined in the determination step to be located at the position where noise is to be multiplexed, specifying a bit region where noise is to be multiplexed in data constituting a low frequency component of the pixel block of interest on the basis of a reference region serving as a converted high frequency component of the pixel block of interest; and a change step of reversibly changing bit information for the bit region in the data of the low frequency component specified in the specifying step.

10. An image processing method of removing visible additional information from multilevel image that is compression-coded by reversibly embedding noise, multiplexing the visible additional information, and converting the data into frequency component data for each pixel block of a predetermined size, comprising:

an input step of inputting, as the additional information, information representing whether or not to multiplex noise for each pixel block of the predetermined size;

a determination step of determining on the basis of the input additional whether a pixel block of interest is located at a position where noise is multiplexed;

a specifying step of, when the pixel block of interest is determined in the determination step to be located at the position where noise is multiplexed, specifying a bit region where noise is multiplexed at a converted low frequency component of the pixel block of interest on the basis of a reference region serving as a converted low frequency component of a neighboring pixel block near the pixel block of interest; and a reconstruction step of performing conversion inverse to noise multiplexing to reconstruct a state of the bit region at the low frequency component of the pixel block of interest specified in the specifying step into a state before multiplexing.

11. An image processing method of removing visible additional information from multilevel image data that is compression-coded by reversibly embedding nose, multiplexing the visible additional information, and converting the data into frequency component data into frequency component data for each pixel block of a predetermined size, comprising:

an input step of inputting, as the additional information, information representing whether or not to multiplex noise for each pixel block of the predetermined size;

a determination step of determining on the basis of the input additional information whether a pixel block of interest is located at a position where noise is multiplexed;

a specifying step of, when the pixel block of interest is determined in the determination step to be located at the position where noise is multiplexed, specifying a bit region where noise is multiplexed at a low frequency component of the block of interest on the basis of a reference region serving as a converted high frequency component of the pixel block of interest; and a reconstruction step of performing conversion inverse to noise multiplexing to reconstruct a state of the bit region at the low frequency component of the pixel block of interest specified in the specifying step into a state before multiplexing.

12. A computer program, embodied in a computer-readable medium, for causing an apparatus to function as an image processing apparatus which converts multilevel image data into frequency component data for each pixel block of a predetermined size to compression-code the multilevel image data, and multiplexes noise on the multilevel image to embed visible additional information with a noise-multiplexed distribution, the apparatus functioning as:

input means for inputting, as the additional information, information representing whether or not to multiplex noise for each pixel block of the predetermined size;

determination means for determining on the basis of the input additional information whether a pixel block of interest is located at a position where noise is to be multiplexed;

specifying means for, when said determination means determines that the pixel block of interest is located at the position where noise is to be multiplexed, specifying a bit region where noise is to be multiplexed in data constituting a converted low frequency component of the pixel block of interest on the basis of a reference region serving as a converted low frequency component of a neighboring pixel block near the pixel block of interest; and change means for reversibly changing bit information for the bit region in the data of the low frequency component specified by said specifying means.

13. A computer-readable storage medium storing a computer program defined in claim 12.

14. A computer program, embodied in a computer-readable medium, for causing an apparatus to function as an image processing apparatus which converts multilevel image data into frequency component data for each pixel block of a predetermined size to compression-code the multilevel image data, and multiplexes noise on the multilevel image to embed visible additional information with a noise-multiplexed distribution, the apparatus functioning as:

input means for inputting, as the additional information, information representing whether or not to multiplex noise for each pixel block of the predetermined size;

determination means for determining on the basis of the input additional information whether a pixel block of interest is located at a position where noise is to be multiplexed;

specifying means for, when said determination means determines that the pixel block of interest is located at the position where noise is to be multiplexed, specifying a bit region where noise is to be multiplexed in data constituting a low frequency component of the pixel block of interest on the basis of a reference region serving as a converted high frequency component of the pixel block of interest; and change means for reversibly changing bit information for the bit region in the data of the low frequency component specified by said specifying means.

15. A computer-readable storage medium storing a computer program defined in claim 14.

16. A computer program, embodied in a computer-readable medium, for causing an apparatus to function as an image processing apparatus which removes visible additional information from multilevel image data that is compression-coded by reversibly embedding noise, multiplexing the visible additional information, and converting the data into frequency component data for each pixel block of a predetermined size, the apparatus functioning as:

input means for inputting, as the additional information, information representing whether or not to multiplex noise for each pixel block of the predetermined size;

determination means for determining on the basis of the input additional information whether a pixel block of interest is located at a position where noise is multiplexed;

specifying means for, when said determination means determines that the pixel block of interest is located at the position where noise is multiplexed, specifying a bit region where noise is multiplexed at a converted low frequency component of the pixel block of interest on the basis of a reference region serving as a converted low frequency component of a neighboring pixel block near the pixel block of interest; and reconstruction means for performing conversion inverse to noise multiplexing to reconstruct a state of the bit region at the low frequency component of the pixel block of interest specified by said specifying means into a state before multiplexing.

17. A computer-readable storage medium storing a computer program defined in claim 16.

18. A computer program, embodied in a computer-readable medium, for causing an apparatus to function as an image processing apparatus which removes visible additional information from multilevel image data that is compression-coded by reversibly embedding noise, multiplexing the visible additional information, and converting the data into frequency component data for each pixel block of a predetermined size, the apparatus functioning as:

input means for inputting, as the additional information, information representing whether or not to multiplex noise for each pixel block of the predetermined size;

determination means for determining on the basis of the input additional information whether a pixel block of interest is located at a position where noise is multiplexed;

specifying means for, when said determination means determines that the pixel block of interest is located at the position where noise is multiplexed, specifying a bit region where noise is multiplexed at a low frequency component of the block of interest on the basis of a reference region serving as a converted high frequency component of the pixel block of interest; and reconstruction means for performing conversion inverse to noise multiplexing to reconstruct a state of the bit region at the low frequency component of the pixel block of interest specified by said specifying means into a state before multiplexing.

19. A computer-readable storage medium storing a computer program defined in claim 18.

* * * * *